United States Patent [19]

Binder et al.

[11] Patent Number: 5,372,896
[45] Date of Patent: Dec. 13, 1994

[54] TREATED SOLID POLYMER ELECTROLYTE MEMBRANE FOR USE IN A FUEL CELL AND FUEL CELL INCLUDING THE TREATED SOLID POLYMER ELECTROLYTE MEMBRANE

[75] Inventors: Michael Binder, Brooklyn, N.Y.; Robert J. Mammone, So. Plainfield, N.J.

[73] Assignee: The United States of America as represented by the Secretary of the Army, Washington, D.C.

[21] Appl. No.: 123,652

[22] Filed: Sep. 20, 1993

[51] Int. Cl.$^5$ .............................................. H01M 8/10
[52] U.S. Cl. ...................................... 429/33; 156/668
[58] Field of Search ................ 429/33; 204/192.36; 156/668

[56] References Cited

U.S. PATENT DOCUMENTS

| | | | |
|---|---|---|---|
| 4,439,292 | 3/1989 | Klotz et al. | 204/165 |
| 5,019,210 | 5/1991 | Chou et al. | 204/192.36 X |
| 5,128,014 | 7/1992 | Banerjee | 204/296 |

*Primary Examiner*—Stephen Kalafut
*Attorney, Agent, or Firm*—Michael Zelenka; Roy E. Gordon

[57] ABSTRACT

A solid polymer electrolyte membrane is treated by brief exposure to a gas plasma prior to the inclusion of the membrane in a fuel cell as a separator between a liquid or gaseous fuel and an oxidant.

24 Claims, No Drawings

TREATED SOLID POLYMER ELECTROLYTE MEMBRANE FOR USE IN A FUEL CELL AND FUEL CELL INCLUDING THE TREATED SOLID POLYMER ELECTROLYTE MEMBRANE

GOVERNMENT INTEREST

The invention described herein may be manufactured, used, and licensed by or for the Government for governmental purposes without the payment to us of any royalty thereon.

FIELD OF INVENTION

The invention relates in general to the treatment of a solid polymer electrolyte membrane (PEM) that is to be used in a fuel cell as an ionically conducting electrolyte and separator between a liquid or gaseous fuel and an oxidant and in particular to such a treatment that increases the ionic conductivity, decreases the permeation of fuel through these PEM and increases the overall performance when these membranes are used in fuel cells or electrochemical compressors.

BACKGROUND OF THE INVENTION

Fuel cells have been studied as a likely candidate for an efficient low emission power source. This is because fuel cells offer the prospect of silent, modular technology for energy generation with few moving parts and little or no toxic emissions. In operational fuel cells, a liquid or gaseous fuel on the anode side and a liquid or gaseous oxidant on the cathode side are separated by an ion conducting electrolyte that prevents these reactants from directly contacting each other. The fuel cell properties and subsequent use in special niche markets, is determined by whether the electrolyte is liquid or solid.

In the case of electric vehicles and mobile, man-portable systems, where lightweight and high power densities by weight and volume fuel cells are needed, development efforts have centered on fuel cells using a solid, ion conducting Polymer Electrolyte Membrane (PEM). A distinctive feature of this type of fuel cell has been that a porous polymer electrolyte membrane (PEM) from about 50–200 microns in thickness in the form of a proton conducting membrane (or film) simultaneously acts as the separator as well as the medium for ionic transport. Use of PEM instead of electrolytes made of aqueous solutions, molten salts, or solid oxides has liberated this particular fuel cell technology from assembly, storage and maintenance problems commonly encountered in using corrosive and/or high temperature liquid electrolytes. Fuel cells using PEMs are expected to have a long shelf life on open circuit stand, and can start-up and operate at temperatures below 100° C. since PEM do not require high temperatures to achieve good ionic conductivity. Operating voltages of PEM fuel cells have been largely determined by the PEM ionic conductivity that is a strong function of its water retention, while current efficiencies have been inversely related to permeation of the anode fuel through the membrane. It would be of obvious interest to increase both the water retention and ionic conductivity, and decrease the permeation of fuel through these PEMs and in general increase the overall performance of fuel cells using these membranes.

Currently, hydrated membranes based on salts of perfluorosulfonic acid (perfluorosulfonates) developed by E. I. Dupont of Wilmington, Del. under the trade name Nafion, and a lower molecular weight analog developed by Dow Chemical Company of Midland, Mich. are currently among the more popular PEMs used in fuel cells. Their chemical structures are basically a sulfonated analog of Teflon with pendant side chains terminating in $SO_3H$ groups. Although these perfluorinated membranes have excellent chemical stability and relatively high protonic conductivity, they are expensive, and available only in certain ranges of thicknesses and specific ionic conductivities. It would be desirable to increase the water retention and ionic conductivities of these membranes. Another fundamental drawback to using PEM in fuel cells has arisen when these membranes have been used in fuel cells using other fuels such as methanol. Since these polymers can be considerably permeable to other fuels such as methanol, the fuel from the anode side can diffuse though the membrane to become the fuel spontaneously oxidized at the cathode side. This direct chemical short reduces the overall cell potential and leads to fuel wastage. If diffusion of either the oxidant or fuel through the PEM could be reduced, fuel cells using fuels other than hydrogen could become a practical reality.

In addition, the surface of the PEM is usually coated with a catalyst layer in order to catalyze the anode or cathode reaction. The interface between the applied catalyst layer and the PEM is important because in order for the fuel cell to operate efficiently, ions must travel through this layer and into the PEM. Improved contact between the catalyst layer and the PEM is important for proper fuel cell performance.

Various methods of improving ionically conducting membranes have been proposed.

In U.S. Pat. No. 5,128,014, Banerjee discusses irradiation of membranes with high energy radiation such as beta rays, gamma rays or x-rays. This procedure is costly, and suffers from safety problems associated with the radioactive species and the maintenance costs. In U.S. Pat. No. 4,439,292, Klotz and Fitzky discuss treating membranes with a corona discharge where an electric discharge or spark is passed from one electrode to the other. The #292 treatment involves applying 1–20 kV across the membrane in either air or carbon dioxide at atmospheric pressure. The #292 patent teaching is also limited to membranes containing carboxylic acids or have been first modified to contain carboxylic anode groups before treatment.

SUMMARY OF THE INVENTION

The general object of this invention is to provide fuel cells having an increased ionic conductivity, decreased permeability of the fuel through PEMs, and overall improved performance in an operating fuel cell.

It has now been found that such improvements in the membrane and fuel cell can be obtained by briefly exposing a PEM to a low pressure room temperature gas plasma or a series of gas plasma treatments.

A gas plasma is easily formed when a low pressure gas or a mixture of gases is activated by either microwaves or rf energy. This process, that can take place even at room temperature, causes bonds in the gas molecules to rupture and form ions, electrons and radicals. These vapor phase reactive species can then collide with material surfaces to cause chemical reactions. For example, gas plasma treatment using oxygen gas has been used to clean contaminated silicon wafer surfaces. A review article on the use of gas plasma has been published by E. M. Liston in J. Adhesion, 30, 199 (1989).

Gas plasma treatment of materials has been used primarily to modify surface properties. No prior work has indicated that gas plasma treatment can be used to modify bulk properties of materials such as electrical or ionic conductivity, water retention, water uptake, permeability of liquids or gases, or ion selectivity.

This invention concerns itself with the possibility of using GAS plasma treatments of PEM in order to modify important bulk and surface properties of these membranes. Modification of the membrane properties also improves fuel cell performance in cells using the treated membranes. This is a tremendous advantage since performance improvements can be achieved with relatively minor modifications and low cost. Although modification of membranes by radiation, corona discharge or grafting have been proposed the treatment of the instant invention uses a nonliquid, low energy, low pressure treatment procedure to achieve substantial improvements in performance.

DESCRIPTION OF THE PREFERRED EMBODIMENT

Table 1 shows ionic conductivity, water uptake and water contact angle of Nafion 117 and Nafion 112 membranes following an 8 minute exposure to various gas plasmas.

TABLE 1

|  | Baseline | Oxygen | $CF_4$ | Ammonia |
|---|---|---|---|---|
| NAFION 117 |  |  |  |  |
| Ionic Conductivity $Scm^{-1}$ | 0.030 | 0.031 | 0.0012 | 0.050 |
| Water Uptake (by weight) | 38.3% | 38.4% | 29.4% | 37.5% |
| Contact Angle | 74° | 78° | 86° | 77° |
| NAPION 112 |  |  |  |  |
| Ionic Conductivity $Scm^{-1}$ | 0.011 | 0.017 | 0.000025 | 0.018 |
| Water Uptake (by weight) | 36.6% | 36.8% | 28.6% | 37.2% |
| Contact Angle | 67° | 72° | 88° | 72° |

According to TABLE 1, the bulk ionic conductivity of Nafion membranes is dramatically decreased by brief treatment with $CF_4$ plasma and increased by about 60% by treatment with ammonia plasma. Thus, the type of gas plasma used is critical to the results obtained. Then too, water uptake (the weight percentage of water) in Nafion membranes can also be altered following a brief exposure to gas plasmas. $CF_4$ treatment has the most effect on the water uptake. The contact angle of the surface of the membrane, which should be related to the permeability of a fuel through the membrane, can also be altered by gas plasma treatments- Membrane properties such as ionic conductivity, water wetability, electroosmotic transport, and tensile strengths; all of which strongly affect fuel cell performance, are strong functions of water content in the membrane. Generally, as water content in the membrane increases, ionic transport properties and ionic conductivities in these membranes increase due to ionization of sulfonic acid groups.

Other gas plasmas that can be used in the invention include $N_2O$, He, $H_2$, $CO_2$, $SO_2$, $O_3$ and $H_2O$.

We wish it to be understood that we do not desire to be limited to the exact details of construction shown and described for obvious modification will occur to a person skilled in the art.

What is claimed:

1. A solid perfluorosulfonate polymer electrolyte membrane (PEM) for use in a fuel cell to separate a liquid or gaseous fuel from an oxidant, said PEM being exposed for about eight minutes to a gas plasma prior to inclusion in the fuel cell.

2. A PEM according to claim 1 wherein the PEM is exposed to a gas plasma selected from the group consisting of oxygen, $CF_4$, ammonia, $N_2O$, He, $H_2$, $CO_2$, $SO_2$, $O_3$, and $H_2O$.

3. A PEM according to claim 2 wherein the gas plasma is oxygen.

4. A PEM according to claim 2 wherein the gas plasma is $CF_4$.

5. A PEM according to claim 2 wherein the gas plasma is ammonia.

6. A PEM according to claim 2 wherein the gas plasma is $N_2O$.

7. A PEM according to claim 2 wherein the gas plasma is He.

8. A PEM according to claim 2 wherein the gas plasma is $H_2$.

9. A PEM according to claim 2 wherein the gas plasma is $CO_2$.

10. A PEM according to claim 2 wherein the gas plasma is $SO_2$.

11. A PEM according to claim 2 wherein the gas plasma is $O_3$.

12. A PEM according to claim 2 wherein the gas plasma is $H_2O$.

13. A fuel cell including a liquid or gaseous fuel separated by a perfluorosulfonate PEM from an oxidant wherein the PEM has been exposed for about eight minutes to a gas plasma prior to inclusion in the fuel cell.

14. A fuel cell according to claim 13 wherein the PEM has been exposed to a gas plasma selected from the group consisting of oxygen, $CF_4$, ammonia, $N_2O$, He, $H_2$, $CO_2$, $SO_2$, $O_3$, and $H_2O$.

15. A fuel cell according to claim 13 wherein the PEM has been exposed to oxygen.

16. A fuel cell according to claim 13 wherein the PEM has been exposed to $CF_4$.

17. A fuel cell according to claim 13 wherein the PEM has been exposed to ammonia.

18. A fuel cell according to claim 13 wherein the PEM has been exposed to $N_2O$.

19. A fuel cell according to claim 13 wherein the PEM has been exposed to He.

20. A fuel cell according to claim 13 wherein the PEM has been exposed to $H_2$.

21. A fuel cell according to claim 13 wherein the PEM has been exposed to $CO_2$.

22. A fuel cell according to claim 13 wherein the PEM has been exposed to $SO_2$.

23. A fuel cell according to claim 13 wherein the PEM has been exposed to $O_3$.

24. A fuel cell according to claim 13 wherein the PEM has been exposed to $H_2O$.

* * * * *